United States Patent
Jorgensen et al.

(10) Patent No.: US 10,220,835 B2
(45) Date of Patent: Mar. 5, 2019

(54) POWER CONTROL SYSTEMS AND METHODS FOR MIXED VOLTAGE SYSTEMS

(71) Applicant: GM Global Technology Operations LLC, Detroit, MI (US)

(72) Inventors: Scott W. Jorgensen, Bloomfield Township, MI (US); Bob R. Powell, Jr., Birmingham, MI (US); Robert S. Conell, Sterling Heights, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 15/446,380

(22) Filed: Mar. 1, 2017

(65) Prior Publication Data
US 2018/0251121 A1    Sep. 6, 2018

(51) Int. Cl.
*B60W 20/50* (2016.01)
*B60W 10/06* (2006.01)
(Continued)

(52) U.S. Cl.
CPC ............ *B60W 20/50* (2013.01); *B60W 10/06* (2013.01); *B60W 10/08* (2013.01); *B60W 10/26* (2013.01);
(Continued)

(58) Field of Classification Search
CPC .................................................. B60W 20/50
See application file for complete search history.

(56) References Cited

U.S. PATENT DOCUMENTS

| 4,564,797 A * | 1/1986 | Binkley | H02J 7/0054 320/105 |
| 6,359,405 B1 * | 3/2002 | Tsurumi | B60K 6/485 318/434 |

(Continued)

FOREIGN PATENT DOCUMENTS

| CN | 103837833 A | 6/2014 |
| CN | 104272554 A | 1/2015 |

(Continued)

OTHER PUBLICATIONS

First Office Action for Chinese Patent Application No. 201611004689.0 dated Jul. 26, 2018 with English language machine translation, 8 pages.

(Continued)

*Primary Examiner* — Hussein Elchanti
*Assistant Examiner* — Michael A Berns
(74) *Attorney, Agent, or Firm* — Harness, Dickey & Pierce, P.L.C.

(57) ABSTRACT

In a vehicle, a first energy storage device has a first direct current (DC) operating voltage; and a second energy storage device has a second DC operating voltage. The second DC operating voltage is greater than or less than the first DC operating voltage the first DC operating voltage. A switch is connected between the first and second energy storage devices. A fault diagnostic module, while an internal combustion engine of the vehicle is shut down, diagnoses that a fault is present when a voltage of the first energy storage device is less than a predetermined DC voltage. The predetermined DC voltage is less than the first DC operating voltage. A switch control module closes the switch when the fault is diagnosed. A starter control module, when the fault is diagnosed, applies power to a starter from the second energy storage device via the switch.

20 Claims, 4 Drawing Sheets

(51) Int. Cl.
*B60W 10/08* (2006.01)
*B60W 10/26* (2006.01)
*B60W 50/14* (2012.01)
*H02M 7/5395* (2006.01)
*H02P 27/08* (2006.01)

(52) U.S. Cl.
CPC .......... *B60W 50/14* (2013.01); *H02M 7/5395* (2013.01); *H02P 27/08* (2013.01); *B60L 2210/10* (2013.01); *B60L 2210/40* (2013.01); *Y10S 903/907* (2013.01); *Y10S 903/93* (2013.01)

(56) References Cited

U.S. PATENT DOCUMENTS

| | | | |
|---|---|---|---|
| 6,769,389 B2 * | 8/2004 | Tamai | B60K 6/485 |
| | | | 123/179.3 |
| 8,116,998 B2 | 2/2012 | Hess | |
| 8,761,994 B2 * | 6/2014 | Mikulec | B60K 6/48 |
| | | | 180/65.25 |
| 8,996,227 B2 * | 3/2015 | Sisk | B60L 11/12 |
| | | | 701/22 |
| 9,108,633 B1 | 8/2015 | Atluri et al. | |
| 9,216,707 B2 | 12/2015 | Namuduri et al. | |
| 9,260,105 B2 * | 2/2016 | Tolkacz | B60K 6/52 |
| 9,302,575 B2 | 4/2016 | Holmes et al. | |
| 9,370,992 B2 | 6/2016 | Holmes et al. | |
| 9,440,654 B2 | 9/2016 | Atluri et al. | |
| 9,452,672 B2 | 9/2016 | Namuduri et al. | |
| 9,475,456 B2 * | 10/2016 | Fetzer | B60L 1/003 |
| 9,481,236 B2 | 11/2016 | Holmes et al. | |
| 9,481,357 B2 | 11/2016 | Namuduri et al. | |
| 9,797,361 B2 * | 10/2017 | Shibachi | F02N 11/0866 |
| 9,828,963 B2 | 11/2017 | Conell et al. | |
| 9,956,931 B2 * | 5/2018 | Janarthanam | B60R 16/033 |
| 2010/0198536 A1 | 8/2010 | Hess | |
| 2013/0141045 A1 | 6/2013 | Karim et al. | |
| 2014/0035529 A1 | 2/2014 | Botts | |
| 2014/0207318 A1 | 7/2014 | Sisk et al. | |
| 2015/0202984 A1 | 7/2015 | Wyatt et al. | |
| 2015/0258946 A1 | 9/2015 | Namuduri et al. | |
| 2015/0260145 A1 | 9/2015 | Holmes et al. | |
| 2015/0295459 A1 | 10/2015 | Hao et al. | |
| 2016/0185225 A1 | 6/2016 | Namuduri et al. | |
| 2016/0272191 A1 | 9/2016 | Atluri et al. | |
| 2017/0326964 A1 | 11/2017 | Lahr et al. | |
| 2017/0326965 A1 | 11/2017 | Lahr et al. | |
| 2017/0328455 A1 | 11/2017 | Li et al. | |
| 2017/0328456 A1 | 11/2017 | Samie et al. | |
| 2017/0334297 A1 | 11/2017 | Hao et al. | |
| 2017/0334422 A1 | 11/2017 | Namuduri et al. | |
| 2017/0335816 A1 | 11/2017 | Hao et al. | |
| 2017/0338706 A1 | 11/2017 | Hao et al. | |
| 2018/0003247 A1 | 1/2018 | Samie et al. | |
| 2018/0015817 A1 | 1/2018 | Samie et al. | |
| 2018/0017121 A1 | 1/2018 | Lahr et al. | |
| 2018/0050685 A1 | 2/2018 | Atluri et al. | |
| 2018/0050686 A1 | 2/2018 | Atluri et al. | |
| 2018/0059190 A1 | 3/2018 | Verbrugge et al. | |
| 2018/0105158 A1 | 4/2018 | Namuduri et al. | |

FOREIGN PATENT DOCUMENTS

| | | |
|---|---|---|
| CN | 106740849 A | 5/2017 |
| DE | 102016121819 A1 | 5/2017 |
| EP | 477252 B1 | 9/1993 |
| WO | WO-2015016966 A3 | 7/2015 |

OTHER PUBLICATIONS

Robert S. Conell et al.; U.S. Appl. No. 14/950,059, filed Nov. 24, 2015, entitled: "Powertrain System with Fault-Tolerant Coasting Control Logic"; 18 pages.

* cited by examiner

POWER CONTROL SYSTEMS AND METHODS FOR MIXED VOLTAGE SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to electrical power systems of vehicles.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, an electrical system of a vehicle includes: a first energy storage device that has a first direct current (DC) operating voltage; and a second energy storage device that has a second DC operating voltage, where the second DC operating voltage is one of (i) greater than the first DC operating voltage and (ii) less than the first DC operating voltage. A switch is connected between the first energy storage device and the second energy storage device. A fault diagnostic module is configured to, while an internal combustion engine of the vehicle is shut down, diagnose that a fault is present when a voltage of the first energy storage device is less than a predetermined DC voltage. The predetermined DC voltage is less than the first DC operating voltage. A switch control module is configured to maintain the switch open when the fault is not diagnosed and to close the switch when the fault is diagnosed. A starter control module is configured to, when the fault is diagnosed, apply power to a starter motor from the second energy storage device via the switch. The starter motor rotatably drives a crankshaft of the internal combustion engine of the vehicle for starting of the internal combustion engine when power is applied to the starter motor.

In further features, the first DC operating voltage is approximately 48 Volts and the second DC operating voltage is 12 Volts.

In further features, the starter control module is further configured to, when the switch is open, apply power to the starter motor from the first energy storage device.

In further features, a DC/DC converter is configured to, when the switch is closed, convert a first DC voltage of the second energy storage device to a second DC voltage. The starter control module is configured to, when the fault is diagnosed, apply power to the starter motor from the second energy storage device via the switch and the DC/DC converter.

In further features, the second DC voltage is greater than the first DC voltage.

In further features, the second DC voltage is less than the first DC voltage.

In further features, an inverter module is configured to apply power to an electric motor of the vehicle from the first energy storage device and to charge the first energy storage device based on power generated by the electric motor.

In further features, a generator is configured to generate power based on rotation of the crankshaft and to charge the second energy storage with the power generated by the generator.

In further features, an engine control module is configured to: when the fault is not diagnosed, selectively shut down the engine without receiving a user input to shut down the engine and the vehicle; and when the fault is diagnosed, only shut down the engine in response to user input to shut down the engine and the vehicle.

In further features, a monitoring module is configured to monitor whether the fault is diagnosed and to illuminate a malfunction indicator light when the fault is diagnosed.

In a feature, a method for a vehicle includes: by a first energy storage device having a first direct current (DC) operating voltage, outputting a first DC voltage; by a second energy storage device having a second DC operating voltage, outputting a second DC voltage, where the second DC operating voltage is one of (i) greater than the first DC operating voltage and (ii) less than the first DC operating voltage; while an internal combustion engine of the vehicle is shut down, diagnosing that a fault is present when the first DC voltage of the first energy storage device is less than a predetermined DC voltage, where the predetermined DC voltage is less than the first DC operating voltage; maintaining a switch open when the fault is not diagnosed and closing the switch when the fault is diagnosed, where the switch is connected between the first energy storage device and the second energy storage device; and when the fault is diagnosed, applying power to a starter motor from the second energy storage device via the switch. The starter motor rotatably drives a crankshaft of the internal combustion engine of the vehicle for starting of the internal combustion engine when power is applied to the starter motor.

In further features, the first DC operating voltage is approximately 48 Volts and the second DC operating voltage is 12 Volts.

In further features, when the switch is open, the method includes applying power to the starter motor from the first energy storage device.

In further features the method further includes, by a DC/DC converter, when the switch is closed, converting a first DC voltage of the second energy storage device to a second DC voltage, where applying power to the starter motor from the second energy storage device via the switch includes, when the fault is diagnosed, applying power to the starter motor from the second energy storage device via the switch and the DC/DC converter.

In further features, the second DC voltage is greater than the first DC voltage.

In further features, the second DC voltage is less than the first DC voltage.

In further features the method further includes: selectively applying power to an electric motor of the vehicle from the first energy storage device; and selectively charging the first energy storage device based on power generated by the electric motor.

In further features the method further includes, by a generator, generating power based on rotation of the crankshaft and charging the second energy storage with the power generated by the generator.

In further features the method further includes: when the fault is not diagnosed, selectively shutting down the engine without receiving a user input to shut down the engine and the vehicle; and when the fault is diagnosed, only shutting down the engine in response to user input to shut down the engine and the vehicle.

In further features the method further includes: monitoring whether the fault is diagnosed; and illuminating a malfunction indicator light when the fault is diagnosed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts fuel with air within cylinders to generate propulsion torque. The engine may output torque to wheels of the vehicle via a transmission. Under some circumstances, an engine control module (ECM) may shut down the engine when the driver has not requested shutdown of the engine or the vehicle. For example, the ECM may shut down the engine during the auto-stop portion of an auto-stop/start event when the vehicle is stopped and the driver has applied the brakes (e.g., by actuating a brake pedal) of the vehicle. As another example, the ECM may shut down the engine for a sail event while the vehicle is moving and the driver is not depressing an accelerator pedal.

After shutting down the engine, the ECM later restarts the engine without the driver requesting starting of the vehicle or the engine. For example, for an auto-start portion of an auto-stop/start event, the ECM may restart the engine when the driver releases the brake pedal. The ECM may restart the engine when the driver actuates (depresses) the accelerator pedal during a sail event.

The vehicle includes a first battery having a first operating voltage (e.g., 48 V) utilized by various electrical components of the vehicle, such as a starter, one or more electric motors, and/or one or more other electrical components. Power is generally applied from the first battery to the starter to start the engine. If the voltage of the first battery falls below a predetermined voltage while the engine is shut down, however, the starter may be unable to start the engine.

According to the present application, the vehicle also includes a second battery having a second operating voltage (e.g., 12 V) utilized by various other electrical components of the vehicle, such as door locks, windows, lights, and/or vehicle accessories. If and when the voltage of the first battery falls below the predetermined voltage, a normally open switch is closed to connect the second battery to a direct current (DC)/DC converter. The DC/DC converter increases or decreases the voltage of the second battery to the first operating voltage (of the first battery). Once the switch is closed, power is applied from the second battery to the starter to start the engine. This allows the engine to be started, despite the voltage of the first battery being less than the predetermined voltage below which the starter may be unable to start the engine.

One or more other actions may also be taken when the voltage of the first battery is less than the predetermined voltage. For example, a diagnostic trouble code (DTC) indicative of the voltage being less than the predetermined voltage may be stored in memory and a malfunction indicator light (MIL) may be illuminated. Shutdown of the engine may also be limited to instances when engine and vehicle shutdown are requested by the driver, for example, by actuating one or more ignition keys, buttons, and/or switches.

Figure 1:
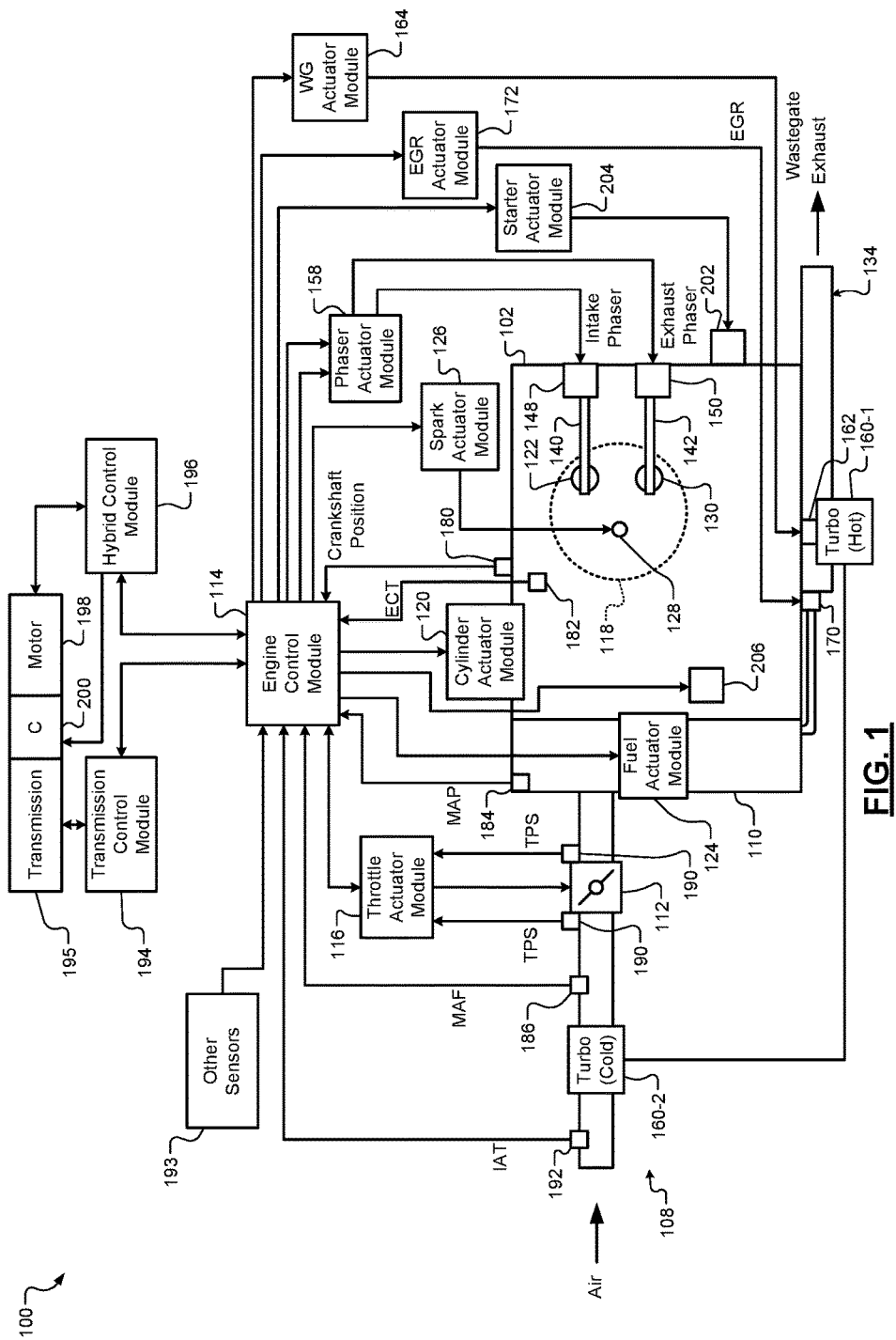
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a first energy storage device to the electric motor 198 to cause the electric motor 198 to output positive torque. The first energy storage device is discussed further below.

The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195.

The hybrid control module 196 may also selectively convert mechanical energy of the vehicle into electrical energy. More specifically, the electric motor 198 generates and outputs power via back EMF when the electric motor 198 is being driven by the transmission 195 and the hybrid control module 196 is not applying power to the electric motor 198 from the first energy storage device. The hybrid control module 196 may charge the first energy storage device via the power output by the electric motor 198. This may be referred to as regeneration.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). Driving the crankshaft to start the engine 102 may be referred to as engine cranking.

The starter motor 202 generally draws power from the first energy storage device to start the engine 102. The vehicle, however, also includes a second energy storage device that is also discussed further below. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft via gears or a belt and convert mechanical energy of the engine 102 into AC power by applying a load to the crankshaft. The generator 206 rectifies the AC power into DC power and stores the DC power in the second energy storage device. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
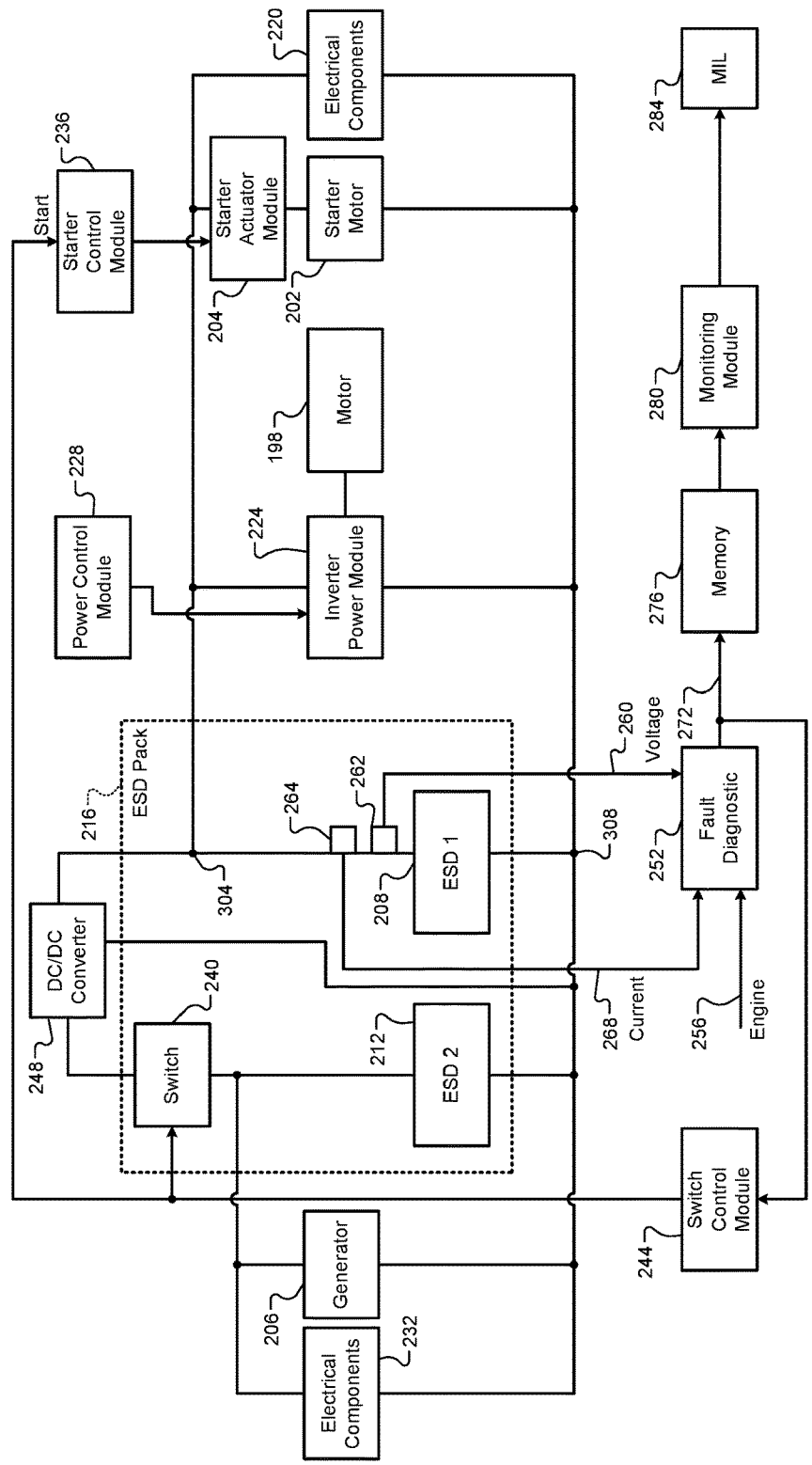
FIG. 2 is a functional block diagram an example electrical system of a vehicle.

FIG. 2 is a functional block diagram of an example electrical system of the vehicle. The electrical system includes the first and second energy storage devices (ESDs) 208 and 212 discussed above. The first and second energy storage devices 208 and 212 may be implemented within an energy storage device pack 216. The energy storage device pack 216 may be a predetermined type of energy storage device packaging, such as an LN series pack specified by the Society of Automotive Engineers (SAE) or another suitable type of energy storage device pack.

The first energy storage device 208 and the second energy storage device 212 are housed within the energy storage device pack 216. The first energy storage device 208 has a first predetermined DC operating voltage, such as 48 Volts (V), 30 V, 28 V, or 24 V. The first energy storage device 208 may be one or more batteries, such as a plurality of Lithium (Li) including (containing) batteries (e.g., Li—C—F), connected to provide the first predetermined operating voltage. However, the first energy storage device 208 may be another suitable type of energy storage device or have another type of battery chemistry.

The second energy storage device 212 has a second predetermined DC operating voltage that is different than the first predetermined operating voltage, such as 12 V. However, the second energy storage device 212 may have another suitable voltage, such as but not limited to 48 V, 30 V, 28 V, or 24 V. The second energy storage device 212 may be another one or more batteries, such as a single 12 V lead acid battery. However, the second energy storage device 212 may have another type of battery chemistry or be another suitable type of energy storage device, such as a super capacitor or a hybrid super capacitor.

A first set of vehicle electrical components operates based on the first predetermined operating voltage and power from the first energy storage device 208. The first set of vehicle electrical components may include, for example but not limited to, the electric motor 198, the starter motor 202, and/or other vehicle electronic components 220.

An inverter power module 224 includes a plurality of switches. The switches are switched to convert DC power from the first energy storage device 208 into alternating current (AC) power and apply the AC power to the electric motor 198 to drive the electric motor 198. For example, the inverter power module 224 may convert the DC power from the first energy storage device 208 into 3-phase AC power and apply the 3-phase AC power to windings of the electric motor 198. A power control module 228 controls switching of the switches of the inverter power module 224 to control application of power to the electric motor 198.

One or more of the first set of vehicle electrical components may also generate power, for example, to charge the first energy storage device 208. For example, the inverter power module 224 converts AC power output by the electric motor 198 (e.g., by the transmission 195 driving the electric motor 198) into DC power and outputs the DC power, for example, to charge the first energy storage device 208. The inverter power module 224 may output power from the electric motor 198, for example, when a voltage output of the electric motor 198 is greater than a voltage of the first energy storage device 208. The power control module 228 may maintain the switches open and operate as a rectifier (e.g., a three-phase rectifier in the case of the electric motor 198 being a three-phase motor) to convert AC power into DC power.

In various implementations, one or more filters are electrically connected between the inverter power module 224 and the first energy storage device 208. The one or more filters may be implemented, for example, to filter power flow to and from the first energy storage device 208. As an example, a filter including one or more capacitors and resistors may be electrically connected in parallel with the inverter power module 224 and the first energy storage device 208.

Figure 3:
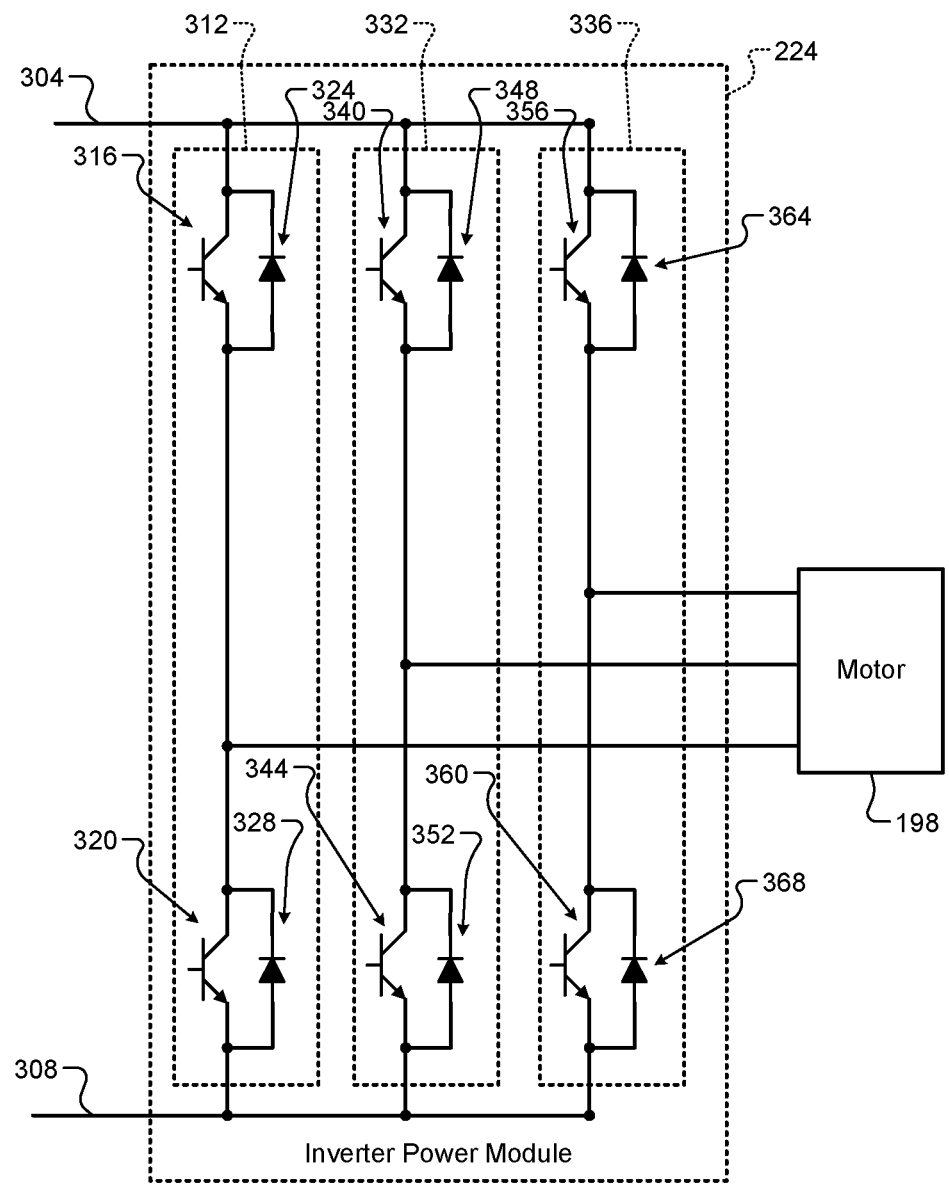
FIG. 3 is a schematic including an example inverter power module.

FIG. 3 includes a schematic including an example implementation of the inverter power module 224. High (positive) and low (negative) sides 304 and 308 are connected to positive and negative terminals, respectively, of the first energy storage device 208. The inverter power module 224 is also connected between the high and low sides 304 and 308.

In the example of the electric motor 198 being a three-phase PM electric motor, the inverter power module 224 may include three legs, one leg connected to each phase of the electric motor 198. A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 may be connected to a first phase of the electric motor 198.

The power control module 228 (FIG. 2) may control switching of the switches 316 and 320 using pulse width modulation (PWM) signals. For example, the power control module 228 may apply PWM signals to the control terminals of the switches 316 and 320. When on, power flows from the first energy storage device 208 to the electric motor 198 to drive the electric motor 198.

For example, the power control module 228 may apply complementary PWM signals to the control terminals of the switches 316 and 320 when applying power from the first energy storage device 208 to the electric motor 198. In other words, the PWM signal applied to the control terminal of the first switch 316 is opposite in polarity to the PWM signal applied to the control terminal of the second switch 320. Short circuit current may flow when the turning on of one of the switches 316 and 320 overlaps with the turning off of the other of the switches 316 and 320. As such, the power control module 228 may generate the PWM signals to turn both of the switches 316 and 320 off during a deadtime period before turning either one of the switches 316 and 320 on. With this in mind, generally complementary may mean that two signals have opposite polarities for most of their periods when power is being output to the electric motor 198. Around transitions, however, both PWM signals may have the same polarity (off) for some overlap deadtime period.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the first energy storage device 208. This charges the first energy storage device 208. The diodes 324 and 328 form one phase of a three-phase rectifier.

The inverter power module 224 also includes second and third legs 332 and 336. The second and third legs 332 and 336 may be (circuitry wise) similar or identical to the first leg 312. In other words, the second and third legs 332 and 336 may each include respective components for the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 may be connected to a second phase of the electric motor 198. The third leg 336 includes switches 356 and 360 and anti-parallel diodes 364 and 368. A node connected to the second terminal of the switch 356 and the first terminal of the switch 360 may be connected to a third phase of the electric motor 198.

The PWM signals provided to the switches of the second and third legs 332 and 336 may also be generally complementary per leg. The PWM signals provided to the second and third legs 332 and 336 may be phase shifted from each other and from the PWM signals provided to the switches 316 and 320 of the first leg 312. For example, the PWM signals for each leg may be phase shifted from each other by 120° (360°/3).

Referring back to FIG. 2, the starter actuator module 204 and the starter motor 202 are also connected between the high side 304 and the low side 308 and, therefore, to the first energy storage device 208. The starter actuator module 204 generally applies power to the starter motor 202 from the first energy storage device 208 to start the engine 102.

A second set of vehicle electrical components operate based on the second predetermined operating voltage of the second energy storage device 212. The second set of vehicle electrical components may include, for example, the generator 206 and/or other vehicle electronic components 232. The other vehicle electronic components 232 may include, for example but not limited to, interior and/or exterior lights of the vehicle, vehicle door locks, vehicle instrumentation, vehicle power window actuators, accessory power outlets of the vehicle (to which non-vehicle electrical components may be connected), and/or other components.

As discussed above, the ECM 114 may shut down the engine 102 under some circumstances when the driver has not input a key OFF command, such as for an auto-stop/start event and for a sailing event. The engine 102 may be later restarted when an engine startup command is received before a next key ON command is received.

For example, a starter control module 236, via the starter actuator module 204, engages the starter motor 202 with the engine 102 and applies power to the starter motor 202 when an auto-start command is received and when an engine start command is received at the end of a sail event. Additionally, the starter control module 236 starts the engine when a key ON command is received. The starter control module 236 may be implemented within the ECM 114, within a body control module, independently, or within another module of the vehicle.

If the voltage of the first energy storage device 208 falls below a predetermined voltage while the engine 102 is shut down, the starter motor 202 may not be able to start the engine 102. The voltage of the first energy storage device 208 may fall below the predetermined voltage, for example, when a fault is present in the first energy storage device 208. The predetermined voltage may correspond to a minimum voltage below which the starter motor 202 may not be able to start the engine 102. For example only, the predetermined voltage may be approximately 26 V in various implementations or another voltage that is less than the first predetermined operating voltage.

According to the present application, a switch 240 is connected to the positive (high) side of the second energy storage device 212. The switch 240 may be implemented within the energy storage device pack 216. The switch 240 may be, for example, IGBT, a relay, or another suitable type of switch.

When the starter motor 202 may not be able to start the engine 102 while the engine 102 is off, a switch control module 244 closes the switch 240. Closing the switch 240 connects the second energy storage device 212 (the high, positive side) with a DC/DC converter 248. The negative (low) side of the second energy storage device 212 may be connected with the low side 308 as shown in FIG. 2 and the low side 308 may be connected to a ground potential, such as a vehicle body. In various implementations, the low sides of the first and second energy storage devices 208 and 212 may be separately connected to ground potentials, such as the vehicle body.

When connected to the second energy storage device 212, the DC/DC converter 248 converts the voltage of the second energy storage device 212 to the first predetermined operating voltage and applies the first predetermined operating voltage to the high side 304. For example, in the example of the second energy storage device 212 being a 12 V battery and the first energy storage device 208 being a 48 V battery (or battery pack), the DC/DC converter 248 converts (i.e., boosts) the 12 V output of the second energy storage device 212 to 48 V and applies the resulting 48 V to the high side 304. The starter motor 202 may then be able to start the engine 102.

The DC/DC converter 248 may be a boost DC/DC converter in the example of the second predetermined operating voltage being less than the first predetermined operating voltage. The DC/DC converter 248 may be a buck converter in the example of the second predetermined operating voltage being greater than the first predetermined operating voltage. The DC/DC converter 248 may be an active (switched) DC/DC converter or a passive (non-switched) DC/DC converter.

When the switch 240 is open, the DC/DC converter 248 is disconnected from the second energy storage device 212 and does not apply power to the high side 304 from the second energy storage device 212. The switch 240 may be normally open and closed in response to a signal from the switch control module 244. The DC/DC converter 248 may be omitted in implementations where the starter motor 202 can start the engine 102 utilizing the second predetermined operating voltage.

A fault diagnostic module 252 diagnoses whether a fault is present (e.g., in the first energy storage device 208) such that the starter motor 204 may not be able to start the engine 102. The fault diagnostic module 252 receives an engine signal 256 indicative of whether the engine 102 is on (running) or off (shut down). The fault diagnostic module 252 may receive the engine signal 256, for example, from the ECM 114.

When the engine signal 256 indicates that the engine 102 is off (and a key OFF command has not been received), the fault diagnostic module 252 may determine that the fault is present when a voltage 260 of the first energy storage device 208 is less than the predetermined voltage. The fault diagnostic module 252 may determine that the fault is not present when the voltage 260 is greater than the predetermined voltage.

Additionally or alternatively, the fault diagnostic module 252 may determine that the fault is present when a state of charge (SOC) of the first energy storage device 208 is less than a predetermined SOC. The starter motor 202 may not be able to start the engine 102 when the SOC of the first energy storage device 208 is less than the predetermined SOC. As an example, the predetermined SOC may be approximately 10%. The fault diagnostic module 252 may determine that the fault is not present when the SOC of the first energy storage device 208 is greater than the predetermined SOC.

A voltage sensor 262 measures the voltage 260 of the first energy storage device 208. For example, the voltage sensor 262 may measure a voltage across the positive and negative terminals of the first energy storage device 208 or the high and low sides 304 and 308. The fault diagnostic module 252 may determine the SOC of the first energy storage device 208 based on the voltage of the first energy storage device 208 and/or current 268 to and from the first energy storage device 208. For example, the fault diagnostic module 252 may determine the SOC using one of a lookup table and an equation that relates voltages of the first energy storage device 208 to SOCs of the first energy storage device 208.

A current sensor 264 measures the current 268 to and from the first energy storage device 208. An example location of the current sensor 264 is shown in the example of FIG. 2, however, the current sensor 264 may be located in another suitable location.

The fault diagnostic module 252 may determine the SOC additionally or alternatively based on the current 268 to and from the first energy storage device 208. For example, the fault diagnostic module 252 may determine a mathematical integral of the current 268 over each predetermined period and add the integration results to determine the SOC. As another example, the fault diagnostic module 252 may scale or offset the voltage 260 based on the current 268, the scalar of offset determined based on the current 268, and determine the SOC using one of a lookup table and an equation that relates these scaled or offset voltages to SOCs of the first energy storage device 208. The fault diagnostic module 252 may determine the SOC further based on a temperature of the first energy storage device 208. The temperature may be, for example, measured using a temperature sensor. The SOC may be provided as a percentage between 0% indicative of 0 charge (i.e., completely discharged) and 100% indicative of the first energy storage device 208 being completely charged.

The fault diagnostic module 252 stores a fault indicator 272 in memory 276 based on the diagnosis. The fault indicator 272 indicates whether the fault is present or not. As such, the fault indicator 272 also indicates whether or not the starter motor 202 may not be able to start the engine 102. For example, the fault diagnostic module 252 may set the fault indicator 272 to a first state when the fault is present and set the fault indicator 272 to a second state when the fault is not present.

A monitoring module 280 may monitor the memory 276 and illuminate a malfunction indicator light (MIL) 284 when the fault indicator 272 is in the first state. In other words, the monitoring module 280 may illuminate the MIL 284 when the fault is diagnosed. One or more other remedial actions may also be taken when the fault is diagnosed. For example, when the fault is diagnosed, the ECM 114 may limit performance of engine shutdowns to only when key OFF commands are received from the driver. As such, the ECM 114 may avoid shutting down the engine 102 between a key ON command and a next key OFF command. For example, the ECM 114 may not shut down the engine 102 for auto-stop commands or for sail events.

The switch control module 244 closes the switch 240 when the fault is diagnosed. For example, the switch control module 244 may close the switch 240 when the fault diagnostic module 252 sets the fault indicator 272 to the first state. The switch control module 244 maintains the switch 240 open when the fault is not present.

As discussed above, closing the switch 240 connects the DC/DC converter 248 with the second energy storage device 212, and the DC/DC converter 248 outputs power for the starter motor 202 based on power output by the second energy storage device 212. The starter control module 236 therefore applies power to the starter motor 202 from the second energy storage device 212 when the fault is diagnosed. For example, the starter control module 236 may engage the starter motor 202 and apply power to the starter motor 202 a predetermined period after the switch 240 is closed or the fault is diagnosed. This may be performed, for example, to allow the output of the DC/DC converter 248 to reach or become within a predetermined voltage of the first predetermined operating voltage.

In various implementations, the starter control module 236 may wait to start the engine 102 to receive an engine startup command, such as an auto-start command or an engine start command for the end of a sail event. Power may be consumed from the second energy storage device 212, however, while waiting. To maximize the possibility of being able to start the engine 102, the starter control module 236 may therefore start the engine 102 and not wait for receipt of an engine startup command, such as an auto-start command or an engine start command for the end of a sail event.

Figure 4:
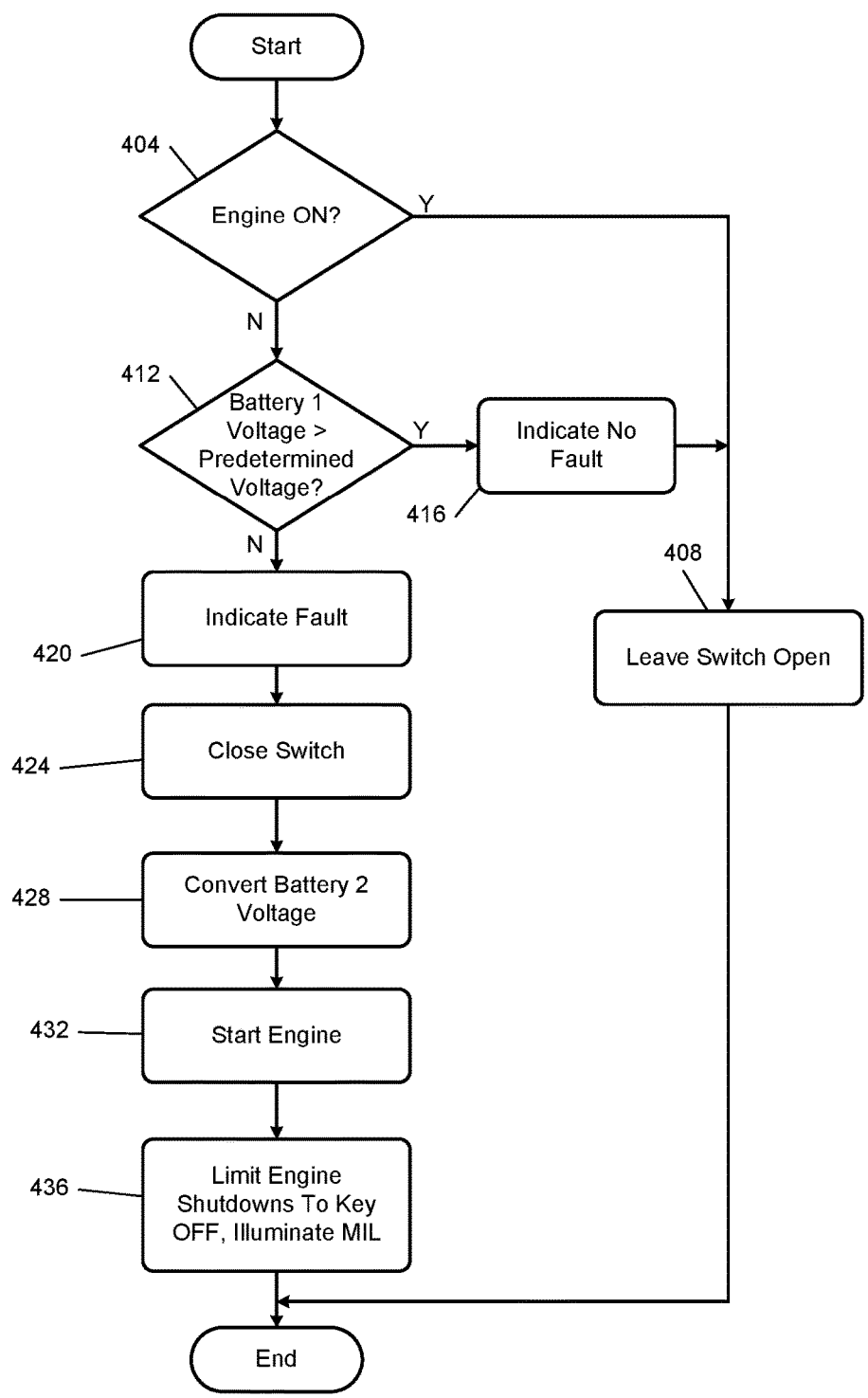
FIG. 4 is a flowchart depicting an example method of diagnosing whether a fault is present and selectively starting an engine.

FIG. 4 is a flowchart depicting an example method of diagnosing a fault and starting the engine 102. Control begins when the vehicle is on pursuant to receipt of a key ON command from a driver and before the next key OFF command is received from the driver. At 404, the fault diagnostic module 252 determines whether the engine 102 is ON. The ECM 114 may shut down the engine 102 before the next key OFF command is received, for example, for a sail event and/or for the auto-stop portion of an auto-stop/start event. If 404 is true (i.e., the engine 102 is ON), the switch control module 244 maintains the switch 240 open at 408, and control may end. When the switch 240 is open, the high side of the second energy storage device 212 is electrically isolated from the DC/DC converter 248, the high side of the first energy storage device 208, and the high side 304. If 404 is false (i.e., the engine 102 is shut down or OFF), control continues with 412.

At 412, the fault diagnostic module 252 may determine whether the voltage 260 of the first energy storage device 208 is greater than the predetermined voltage. Additionally or alternatively, the fault diagnostic module 252 may determine whether the SOC of the first energy storage device 208 is greater than the predetermined SOC. If 412 is true, the fault diagnostic module 252 indicates that the fault is not present at 416 and control transfers to 408, as discussed above. If 412 is false, control continues with 420.

The fault diagnostic module 252 generates the fault indicator 272 to indicate that the fault is present at 420. For example, the fault diagnostic module 252 may set the fault indicator 272 to the first state. The fault indicator 272 may be a predetermined diagnostic trouble code (DTC) associated with the fault and may be stored in the memory 276.

At 424, based on the diagnosis of the fault, the switch control module 244 closes the switch 240. For example, the switch control module 244 may close the switch 240 in response to the fault diagnostic module 252 setting the fault indicator 272 to the first state.

When the switch 240 is closed, the DC/DC converter 248 is connected to the high side of the second energy storage device 212. At 428, the DC/DC converter 248 converts the voltage of the second energy storage device 212 toward or to the first predetermined operating voltage and outputs the resulting voltage to the high side 304. At 432, when the fault is diagnosed and the switch 240 is closed, the starter control module 236 applies power to the starter motor 202 to start the engine 102 using power from the second energy storage device 212. When the fault is diagnosed, the starter motor 202 may not be able to start the motor via drawing power from only the first energy storage device 208.

At 436, when the fault is diagnosed, one or more other remedial actions may be performed. For example, the ECM 114 may limit performance of engine shutdowns to instances when key OFF commands are received. For example, the ECM 114 may not shut down the engine 102 for auto-stop/ start events and may not shut down the engine 102 for sail events. Additionally or alternatively, the monitoring module 280 may illuminate the MIL 284 when the fault is diagnosed. Control may then end. While the example of FIG. 4 is shown and discussed as ending, FIG. 4 may be illustrative of one control loop and control may return to 404. Control loops may be started every predetermined period during the period between each key ON command and the next key OFF command.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An electrical system of a vehicle, comprising:
   a first energy storage device that has a first direct current (DC) operating voltage;
   a second energy storage device that has a second DC operating voltage,
   wherein the second DC operating voltage is one of (i) greater than the first DC operating voltage and (ii) less than the first DC operating voltage;
   a switch connected between the first energy storage device and the second energy storage device;
   a fault diagnostic module configured to, while an internal combustion engine of the vehicle is shut down, diagnose that a fault is present when a voltage of the first energy storage device is less than a predetermined DC voltage,
   wherein the predetermined DC voltage is less than the first DC operating voltage;
   a switch control module configured to maintain the switch open when the fault is not diagnosed and to close the switch when the fault is diagnosed; and
   a starter control module configured to, when the fault is diagnosed, apply power to a starter motor from the second energy storage device via the switch,
   wherein the starter motor rotatably drives a crankshaft of the internal combustion engine of the vehicle for starting of the internal combustion engine when power is applied to the starter motor.

2. The electrical system of claim 1 wherein the first DC operating voltage is approximately 48 Volts and the second DC operating voltage is 12 Volts.

3. The electrical system of claim 1 wherein the starter control module is further configured to, when the switch is open, apply power to the starter motor from the first energy storage device.

4. The electrical system of claim 1 further comprising a DC/DC converter configured to, when the switch is closed, convert a first DC voltage of the second energy storage device to a second DC voltage,
   wherein the starter control module is configured to, when the fault is diagnosed, apply power to the starter motor from the second energy storage device via the switch and the DC/DC converter.

5. The electrical system of claim 4 wherein the second DC voltage is greater than the first DC voltage.

6. The electrical system of claim 4 wherein the second DC voltage is less than the first DC voltage.

7. The electrical system of claim 1 further comprising:
an inverter module configured to apply power to an electric motor of the vehicle from the first energy storage device and to charge the first energy storage device based on power generated by the electric motor.

8. The electrical system of claim 7 further comprising a generator configured to generate power based on rotation of the crankshaft and to charge the second energy storage device with the power generated by the generator.

9. The electrical system of claim 1 further comprising an engine control module configured to:
when the fault is not diagnosed, selectively shut down the engine without receiving a user input to shut down the engine and the vehicle; and
when the fault is diagnosed, only shut down the engine in response to user input to shut down the engine and the vehicle.

10. The electrical system of claim 1 further comprising a monitoring module configured to monitor whether the fault is diagnosed and to illuminate a malfunction indicator light when the fault is diagnosed.

11. A method for a vehicle, comprising:
by a first energy storage device having a first direct current (DC) operating voltage, outputting a first DC voltage;
by a second energy storage device having a second DC operating voltage, outputting a second DC voltage,
wherein the second DC operating voltage is one of (i) greater than the first DC operating voltage and (ii) less than the first DC operating voltage;
while an internal combustion engine of the vehicle is shut down, diagnosing that a fault is present when the first DC voltage of the first energy storage device is less than a predetermined DC voltage,
wherein the predetermined DC voltage is less than the first DC operating voltage;
maintaining a switch open when the fault is not diagnosed and closing the switch when the fault is diagnosed, wherein the switch is connected between the first energy storage device and the second energy storage device; and
when the fault is diagnosed, applying power to a starter motor from the second energy storage device via the switch,
wherein the starter motor rotatably drives a crankshaft of the internal combustion engine of the vehicle for starting of the internal combustion engine when power is applied to the starter motor.

12. The method of claim 11 wherein the first DC operating voltage is approximately 48 Volts and the second DC operating voltage is 12 Volts.

13. The method of claim 11 further comprising, when the switch is open, applying power to the starter motor from the first energy storage device.

14. The method of claim 11 further comprising, by a DC/DC converter, when the switch is closed, converting a first DC voltage of the second energy storage device to a second DC voltage,
wherein applying power to the starter motor from the second energy storage device via the switch includes, when the fault is diagnosed, applying power to the starter motor from the second energy storage device via the switch and the DC/DC converter.

15. The method of claim 14 wherein the second DC voltage is greater than the first DC voltage.

16. The method of claim 14 wherein the second DC voltage is less than the first DC voltage.

17. The method of claim 11 further comprising:
selectively applying power to an electric motor of the vehicle from the first energy storage device; and
selectively charging the first energy storage device based on power generated by the electric motor.

18. The method of claim 17 further comprising, by a generator, generating power based on rotation of the crankshaft and charging the second energy storage device with the power generated by the generator.

19. The method of claim 11 further comprising:
when the fault is not diagnosed, selectively shutting down the engine without receiving a user input to shut down the engine and the vehicle; and
when the fault is diagnosed, only shutting down the engine in response to user input to shut down the engine and the vehicle.

20. The method of claim 11 further comprising:
monitoring whether the fault is diagnosed; and
illuminating a malfunction indicator light when the fault is diagnosed.

* * * * *